US007171526B2

(12) United States Patent
Cruz (10) Patent No.: US 7,171,526 B2
(45) Date of Patent: Jan. 30, 2007

(54) MEMORY CONTROLLER USEABLE IN A DATA PROCESSING SYSTEM

(75) Inventor: Arnaldo R. Cruz, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 315 days.

(21) Appl. No.: 10/703,924

(22) Filed: Nov. 7, 2003

(65) Prior Publication Data

US 2005/0102444 A1 May 12, 2005

(51) Int. Cl.
*G06F 13/00* (2006.01)

(52) U.S. Cl. ............... 711/150; 711/154; 710/242; 710/22

(58) Field of Classification Search ............ 709/214; 711/11, 154; 712/31–33, 35; 720/22, 190
See application file for complete search history.

(56) References Cited

U.S. PATENT DOCUMENTS

| | | | | |
|---|---|---|---|---|
| 4,485,455 A | * | 11/1984 | Boone et al. ............ 708/130 |
| 5,602,597 A | * | 2/1997 | Bertram ............... 725/56 |
| 5,784,582 A | * | 7/1998 | Hughes ............... 710/117 |
| 5,802,554 A | | 9/1998 | Cáceres et al. |
| 5,822,251 A | | 10/1998 | Bruce et al. |
| 5,956,743 A | * | 9/1999 | Bruce et al. ............ 711/103 |
| 6,011,546 A | * | 1/2000 | Bertram ............... 715/700 |
| 6,157,398 A | * | 12/2000 | Jeddeloh ............... 345/532 |
| 6,298,370 B1 | * | 10/2001 | Tang et al. ............ 718/102 |
| 6,336,180 B1 | * | 1/2002 | Long et al. ............ 712/34 |
| 6,480,929 B1 | * | 11/2002 | Gauthier et al. ......... 711/105 |
| 6,535,422 B2 | * | 3/2003 | Goto et al. ............ 365/185.11 |
| 6,683,817 B2 | * | 1/2004 | Wei et al. ............ 365/230.03 |
| 6,708,257 B2 | * | 3/2004 | Bao ................... 711/154 |
| 6,757,211 B2 | * | 6/2004 | Zitlaw et al. ......... 365/230.06 |
| 6,813,184 B2 | * | 11/2004 | Lee ................... 365/185.09 |
| 6,874,044 B1 | * | 3/2005 | Chou et al. ............ 710/62 |
| 6,944,063 B2 | * | 9/2005 | Chen et al. ............ 365/185.33 |
| 2001/0052060 A1 | * | 12/2001 | Bao ................... 711/167 |
| 2003/0028708 A1 | | 2/2003 | Moran |

(Continued)

OTHER PUBLICATIONS

Powell, Michael et al.; Gated-$V_{dd}$: A Circuit Technique to Reduce Leakage in Deep-Submicron Cache Memories; ISLPED '00, Rapallo, Italy; 2000; pp. 90-95; ACM.

*Primary Examiner*—Reginald Bragdon
*Assistant Examiner*—Thanh D. Vo
(74) *Attorney, Agent, or Firm*—Joanna G. Chiu; Susan C. Hill (57) ABSTRACT

One embodiment relates to a memory controller using an independent memory controller bus in order to transfer data between two or more memories. One embodiment of a data processing system includes a system bus, a system bus master coupled to the system bus, a first memory controller for controlling a first memory, a second memory controller for controlling a second memory, and a memory controller bus operating independent of the system bus to transfer data between the first memory controller and the second memory controller. The memory controller bus may include a data bus and read, write, and acknowledge signals. In one embodiment, the first memory is a block accessible memory such as a NAND Flash memory and the second memory is a random access memory (RAM) such as an SDRAM. The second memory may include arbitration logic for arbitrating between the system bus master and the first memory controller.

19 Claims, 3 Drawing Sheets

U.S. PATENT DOCUMENTS

| | | |
|---|---|---|
| 2003/0028760 A1 | 2/2003 | Chang et al. |
| 2003/0202383 A1* | 10/2003 | Shiota et al. .......... 365/185.33 |
| 2004/0049624 A1* | 3/2004 | Salmonsen ................. 710/306 |
| 2004/0049797 A1* | 3/2004 | Salmonsen ................. 725/132 |
| 2004/0120206 A1* | 6/2004 | Kang .................... 365/230.03 |
| 2005/0091432 A1* | 4/2005 | Adams et al. .............. 710/100 |

* cited by examiner

MEMORY CONTROLLER USEABLE IN A DATA PROCESSING SYSTEM

FIELD OF THE INVENTION

The present invention relates generally to a memory controller, and more specifically, to a memory controller useable in a data processing system.

RELATED ART

Low power consumption has been gaining importance in data processing systems, due, for example, to wide spread use of portable and handheld applications. Many data processing systems today use a direct memory access (DMA) coupled to the system bus for transferring data to and from memories coupled to the system bus. However, these memory transfers controlled by the DMA over the system bus may result in increased power consumption and reduced performance due, for example, to the complexity of the DMA and the need to communicate via the system bus. Therefore, a need exists for an improved memory controller which may allow for reduced power consumption and increased performance.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Therefore, each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" preceding a number indicates that the number is represented in its binary or base two form.

As will be described herein, one embodiment relates to a memory controller, useable within a data processing system, having a tightly coupled, independent memory controller bus in order to efficiently transfer data between two or more memories. Furthermore, circuitry for performing direct memory access (DMA) transfers between the two or more memories may be distributed within the memory controller for these two or more memories. Therefore, in one embodiment, a separate direct memory access (DMA) unit within data processing system is not necessary to communicate with these two or more memories.

Figure 1:
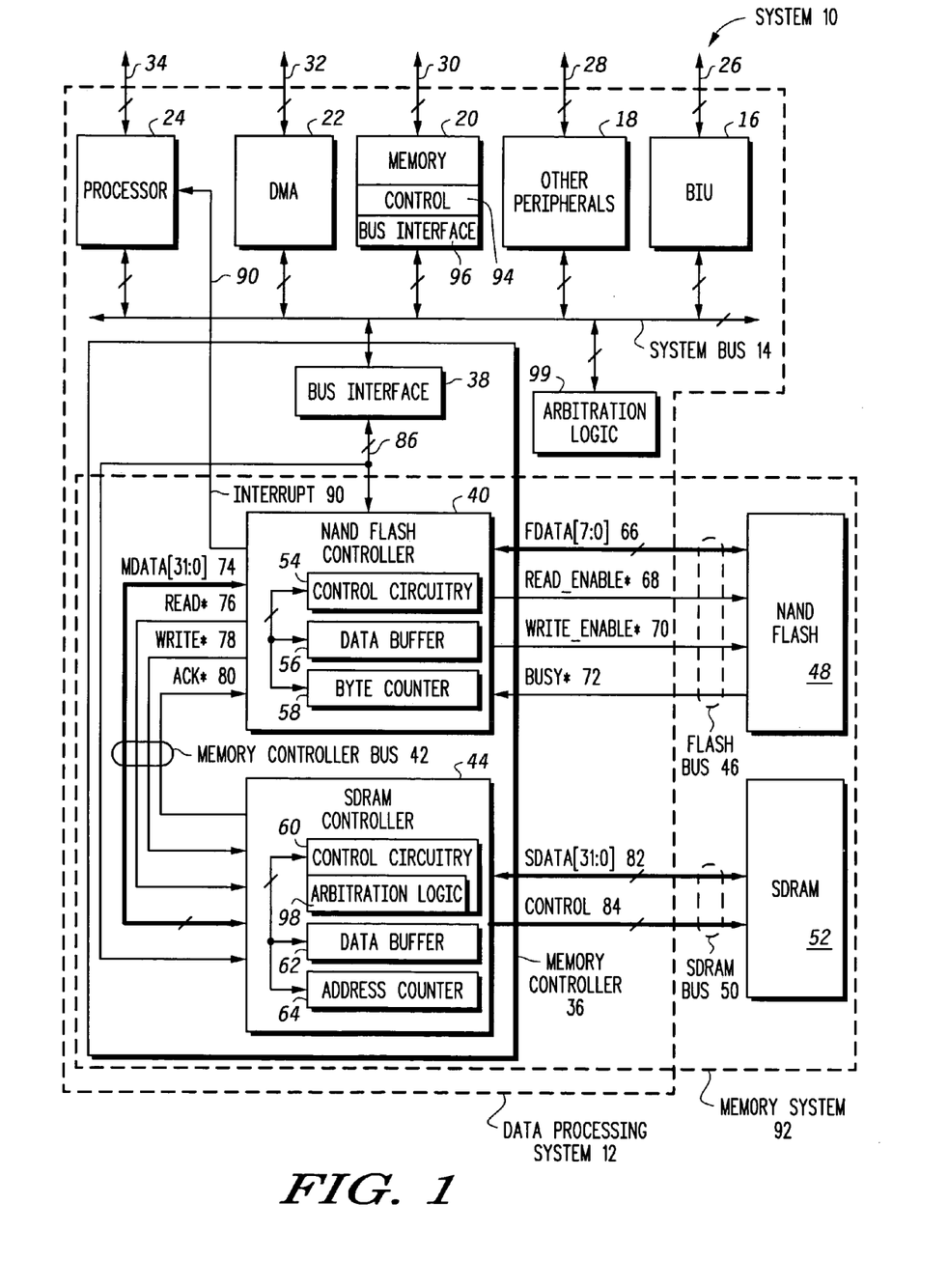
FIG. 1 illustrates, in block diagram form, a system in accordance with one embodiment of the present invention.

FIG. 1 illustrates, in block diagram form, a system 10 in accordance with one embodiment of the present invention. System 10 includes a data processing system 12, a NAND Flash 48, and a synchronous dynamic random access memory (SDRAM) 52. Data processing system 12 includes a processor 24, a DMA 22, a memory 20, other peripherals 18, a memory controller 36, arbitration logic 99, and a bus interface unit (BIU) 16, each bidirectionally coupled to a system bus 14. Processor 24, DMA 22, memory 20, other peripherals 18, and BIU 16 are coupled to bidirectional data processing system terminals 34, 32, 30, 28, and 26, respectively, so that they may communicate to circuitry external to data processing system 12. Note that any of data processing system terminals 34, 32, 30, 28, and 26 may be optional.

Processor 24 may be any type of processor, such as, for example, a microprocessor, microcontroller, central processing unit (CPU), digital signal processor (DSP), etc. In one embodiment, processor 24 may be any type of bus master for system bus 14. Also note that in one embodiment, DMA 22 may also be a bus master for system bus 14. Memory 20 includes a control portion 94 and a bus interface 96. Memory 20 can be any type of memory such as, for example, a read only memory (ROM), a random access memory (RAM), non-volatile memory (e.g. Flash), etc. Note that data processing system 12 may include any number of memories, like memory 20, bidirectionally coupled to system bus 14. Other peripherals 18 may include any number of peripherals (0 or more), where each peripheral can be any type of peripheral such as, for example, a universal asynchronous receiver transmitter (UART), a real time clock (RTC), a timer, a keyboard controller, etc. BIU 16 may be used to interface with other types of buses external to data processing system 12. Also, although not illustrated, data processing system 12 may also include input/output (I/O) circuitry coupled to system bus 14 which may include any type of I/O circuitry which receives or provides information external to data processing system 12.

DMA 22 is used to transfer data to and from memories coupled to system bus 14 (such as, for example, memory 20), via system bus 14. Note that if no memories like memory 20 are coupled to system bus 14, then DMA 22 may not be present in data processing system 12. For example, as will be described in more detail below, transfers between NAND Flash 48 and SDRAM 52 are not performed by DMA 22. Instead, these transfers are controlled by memory controller 36. Arbitration logic 99 performs arbitration of system bus 14. Any known scheme of arbitration may be implemented by arbitration logic 99. Note that processor 24, DMA 22, Memory 20 (including control 94 and bus interface 96), other peripherals 18, arbitration logic 99, and BIU 16 all operate as known in the art, and therefore will not be described in more detail herein. Also note that alternate embodiments may include more or less or different elements or circuitry coupled to system bus 14 than those illustrated in FIG. 1.

Data processing system 12 also includes a memory controller 36 bidirectionally coupled to system bus 24. Data processing system 12 includes a bus interface 38, a NAND Flash controller 40, a synchronous dynamic random access memory (SDRAM) controller 44, and a memory controller bus 42 coupled between NAND Flash controller 40 and SDRAM controller 44. Memory controller bus 42 includes a 32-bit data bus, MDATA[31:0] 74 (also referred to as data bus 74) coupled between NAND Flash controller 40 and SDRAM controller 44, a READ* signal 76 provided from NAND Flash controller 40 to SDRAM controller 44, a WRITE* signal 78 provided from NAND Flash controller 40 to SDRAM controller 44, and an ACK* signal 80 provided from SDRAM controller 44 to NAND Flash controller 40. Note that in alternate embodiments, memory controller bus 42 may include more or less signals, as needed, and each signal may include a different number of bits. For example, data bus 74 may be smaller or larger than a 32 bit bus. Bus interface 38 is bidrectionally coupled to system bus 14, NAND Flash controller 40, and SDRAM controller 44. Bus interface 38 is bidirectionally coupled to NAND Flash controller 40 and SDRAM controller 44 via conductors 86. NAND Flash controller 40 includes control circuitry 54 bidirectionally coupled to a data buffer 56 and a byte counter 58. SDRAM controller 44 includes control circuitry 60 (including arbitration logic 98) bidirectionally coupled to a data buffer 62 and an address counter 64.

NAND Flash controller 40 is bidirectionally coupled to NAND Flash 48 via flash bus 46, and SDRAM controller 44 is bidirectionally coupled to SDRAM 52 via SDRAM bus 50. Flash bus 46 includes an 8-bit data bus, FDATA[7:0] 66 (also referred to as data bus 66) coupled between NAND Flash controller 40 and NAND Flash 48, a READ_ENABLE* signal 68 provided from NAND Flash controller 40 to NAND Flash 48, a WRITE_ENABLE* signal 70 provided from NAND Flash controller 40 to NAND Flash 48, and a BUSY* signal 72 provided from NAND Flash 48 to NAND Flash controller 40. SDRAM bus 50 includes a 32-bit data bus, SDATA[31:0] 82 (also referred to as data bus 82) coupled between SDRAM controller 44 and SDRAM 52, and control signals 84 provided from SDRAM controller 44 to SDRAM 52. Note that in alternate embodiments, each of flash bus 46 and SDRAM bus 50 may include more or less signals, as needed, and each signal may include a different number of bits. For example, in another embodiment, data bus 66 may be a 16-bit bus. Similarly, data bus 82 may be a larger or smaller bus.

Note that NAND Flash controller 40, SDRAM controller 44, memory controller bus 42, flash bus 46, NAND Flash 48, SDRAM bus 50, an SDRAM 52 form a memory system 92, as illustrated in FIG. 1. Note that in the illustrated embodiment, memory controller 36 is coupled to NAND Flash 48 and SDRAM 52. In one embodiment, memory controller 36 may include data processing system terminals or integrated circuit (IC) terminals that can be coupled to Flash bus 46 and SDRAM bus 50. Therefore, in one embodiment, NAND Flash 48 and SDRAM 52 may not be present within system 10, and may instead be coupled to memory controller 36 at a later time. Also note that system 10 and data processing system 12 may be formed using any number of integrated circuits. For example, in one embodiment, all of data processing system 12 may be on a single IC. Alternatively, data processing system 12 may be formed on any number of ICs.

In operation, memory controller 36 controls data transfers between NAND Flash 48 and SDRAM 52. NAND Flash 48 is a block accessible memory rather than a random access memory (unlike a NOR Flash which is considered a random access memory). That is, for each write or read, a block of data is transferred. In one embodiment, a block size of 512 bytes is transferred each time. Alternatively, other block sizes may be used, depending on the design of NAND Flash 48. In alternate embodiments, any other type of block accessible memory may be used in place of NAND Flash 48. However, for ease of explanation, a NAND Flash memory will be used as an example. Note that any type of random access memory (RAM) may be used in place of SDRAM 52. For example, a static RAM (SRAM), or an asynchronous memory such as a dynamic RAM (DRAM) may be used. However, for ease of explanation, an SDRAM will be used as an example. In the illustrated example, prior to being able to use data residing in NAND Flash 48, the data has to be transferred out of NAND Flash 48 into another memory, such as SDRAM 52. For example, if processor 24 needs to use data within NAND Flash 48, this data is first transferred to SDRAM 52, and processor 24 may then communicate with SDRAM 52 (via, for example, system bus 14, bus interface 38, and conductors 86).

NAND Flash Controller 40, SDRAM controller 44, and memory controller bus 42 are used to transfer data between NAND Flash 48 and SDRAM 52. Note that for these transfers, the data is provided via data buses 82, 74, and 66, and need not be provided via system bus 14. Therefore, note that the DMA operations between NAND Flash 48 and SDRAM 52 are performed by NAND Flash controller 40 and SDRAM controller 44. Therefore, since the DMA operations between NAND Flash 48 and SDRAM 52 are performed within memory controller 36, distributed between NAND Flash controller 40 and SDRAM controller 44, a separate DMA unit is not needed for NAND Flash 48 and SDRAM 52. Furthermore, in one embodiment, only those DMA elements and circuitry needed for performing transfers between NAND Flash 48 and SDRAM 52 are included within memory controller 36. Thus, less circuitry is required as compared to using a full fledged DMA unit, such as DMA 22. That is, DMA 22 may be used to transfer data to and from memory 20 via system bus 14; however, DMA 22 is not needed for data transfers between NAND Flash 48 and SDRAM 52. (Therefore, note that if no memories like memory 20 are coupled to system bus 14, then DMA 22 may not be present at all in data processing system 12.)

In the illustrated embodiment (as will be described in more detail in reference to FIGS. 3–4), NAND Flash controller 40 operates as a master of memory controller bus 42, thus controlling transfers to and from SDRAM controller 44. SDRAM controller 44 may operate as a slave to both NAND Flash controller 40 and processor 24. Therefore, requests for transfers may be provided both via data bus 74 and via conductors 86 from system bus 14. In the case where two requests are simultaneously received, arbitration logic 98 within SDRAM controller 44 may arbitrate between the two requests. For example, in this manner, during a data transfer initiated by NAND Flash controller 40, processor 24 may continue to request data transfers to and from SDRAM 52, where these requests will be arbitrated by arbitration logic 98, using, for example, any known arbitration scheme. (Note that arbitration logic 98, while illustrated as being within SDRAM controller 44, may be located anywhere within memory controller 36 or memory system 92 of FIG. 1.)

Note that as transfers occur between NAND Flash controller 40 and SDRAM controller 44 via memory controller bus 42, operations can continue to occur, independently, over system bus 14. That is, in the illustrated embodiment, memory controller bus 42 is independent of system bus 14 such that transfers over system bus 14 do not directly affect transfers over memory controller bus 42. Furthermore, memory controller bus 42 may be autonomous from system bus 14, such they are completely independent. Operation of memory system 92 will be described in more detail below in reference to FIGS. 2–4.

Figure 2:
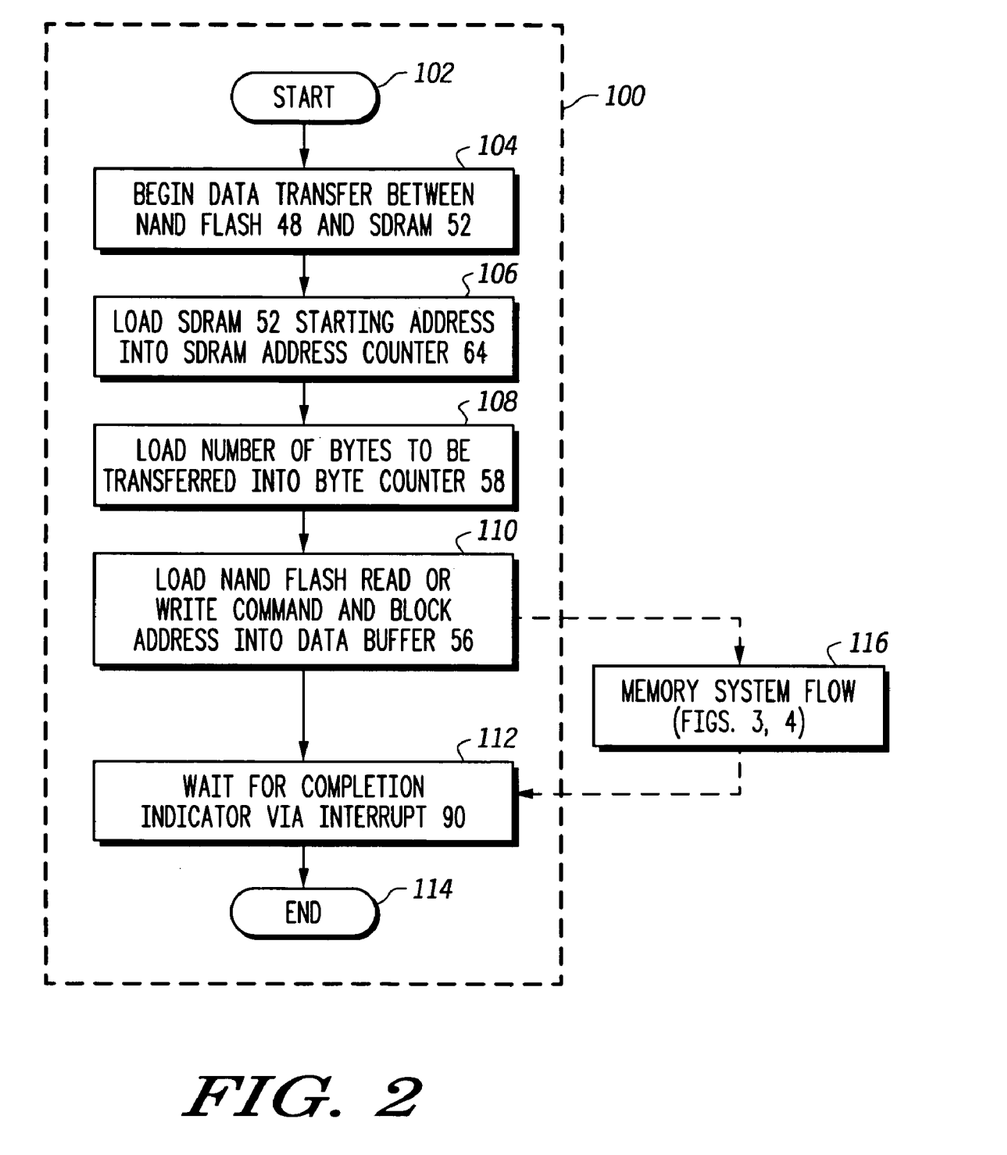
FIG. 2. illustrates, in flow diagram form, a processor flow, in accordance with one embodiment of the present invention.

FIG. 2 illustrates a processor flow 100 for transferring data between NAND Flash 48 and SDRAM 52, in accordance with one embodiment of the present invention. In one embodiment, processor flow 100 is the method of transferring data as seen by, for example, processor 24. In an alternate embodiment, processor flow 100 may correspond to the flow as seen by any bus master initiating a data transfer between NAND Flash 48 and SDRAM 52. Furthermore, in one embodiment, the methods of processor flow 100 are performed primarily by software executing in the processor or bus master, such as, for example, processor 24. Note that FIG. 2 also illustrates a memory system flow 116 (performed between blocks 110 and 112 of processor flow 100) as seen by memory system 92 and as will be further described in reference to FIGS. 3 and 4.

Processor flow 100 begins with start 102 and proceeds to block 104 where a data transfer between NAND Flash 48 and SDRAM 52 is initiated. (As mentioned above with respect to FIG. 1, NAND Flash 48 and SDRAM 52 are being used as example memories; however, in alternate embodiments, different type of memories may be used instead of NAND Flash 48 and SDRAM 52, and the flows of FIGS. 2–4 may therefore still apply to these different types of memories.) The data transfer can either be a data transfer from NAND Flash 48 to SDRAM 52 or from SDRAM 52 to NAND Flash 48. Flow then proceeds to block 106 where an SDRAM 52 starting address is loaded into SDRAM address counter 64. This starting address may correspond to a source address for data transfers from SDRAM 52 (i.e. reads from SDRAM 52) or a target address for data transfers to SDRAM 52 (i.e. writes to SDRAM 52). Therefore, note that processor flow 100 may correspond to either read or write transactions.

After block 106, flow proceeds to block 108 where the total number of bytes to be transferred between NAND Flash 48 and SDRAM 52 is loaded into byte counter 58. Therefore, byte counter 58 may be used to keep track of the number of bytes transferred (either to NAND Flash 48 or from NAND Flash 48) to determine when the transfer is complete. In an alternate embodiment, counter 58 may count any size of data portions transferred between NAND Flash 48 and SDRAM 52. That is, bytes are just one example of a data portion size which may be counted by counter 58.

After block 108, flow proceeds to block 110 where a NAND Flash 48 read or write command and block address is loaded into data buffer 56. Therefore, since NAND Flash controller 40 operates as the master of memory controller bus 42 in the illustrated embodiment, the command provided by processor 24 (or any other system bus 14 bus master) corresponds to NAND Flash 48, where a NAND Flash 48 read command corresponds to a data transfer from NAND Flash 48 to SDRAM 52 and a NAND Flash 48 write command corresponds to a data transfer from SDRAM 52 to NAND Flash 48. (Note that in the illustrated embodiment, as described above, before processor 24 may use data within NAND Flash 48, it needs to be transferred to another memory, such as SDRAM 52 which is a random access memory useable by processor 24. Therefore, in this case, processor 24 may initiate a NAND Flash 48 read command so that data is transferred to SDRAM 52.) In block 110 the block address also gets loaded into data buffer 56, where the block address corresponds to a block address of NAND Flash 48 from which to read the data to be transferred to SDRAM 52 or where to write the data received from SDRAM 52. Note that in one embodiment, the block address corresponds to a page address of NAND Flash 48, where the page address indicates one or more of N pages. Alternatively, the block address can refer to the address of any block size. For example, in one embodiment, the block address corresponds to a block size of 512 bytes where a full 512 bytes of data is transferred to or from NAND Flash 48.

After the NAND Flash read or write command and block address is loaded into data buffer 56, memory system 92 begins performing the data transfer. Upon completion of the data transfer, as will be described with respect to memory system flow 116 of FIGS. 3 and 4, a completion indicator will be provided to the initiating system bus 14 bus master (such as, for example, processor 24). In one embodiment, this completion indicator is an interrupt provided via interrupt 90 from NAND Flash controller 40 to processor 24. However, in alternate embodiments, the completion indicator can be provided in other ways to processor 24. For example, NAND Flash controller 40 may write a status bit to a register or memory location which may be periodically polled by processor 24 to determine when the transfer is complete. Also note that a completion indicator may be provided to other system bus 14 bus masters, as needed, via, for example, an interrupt signal, or by any other form, to indicate completion of the data transfer to the bus master which initiated the transfer. Therefore, flow then proceeds from block 110 to block 112 where processor flow 100 waits for the completion indicator. Once the completion indicator is received (by, for example, processor 24), processor flow 100 ends at end 114.

Figure 3:
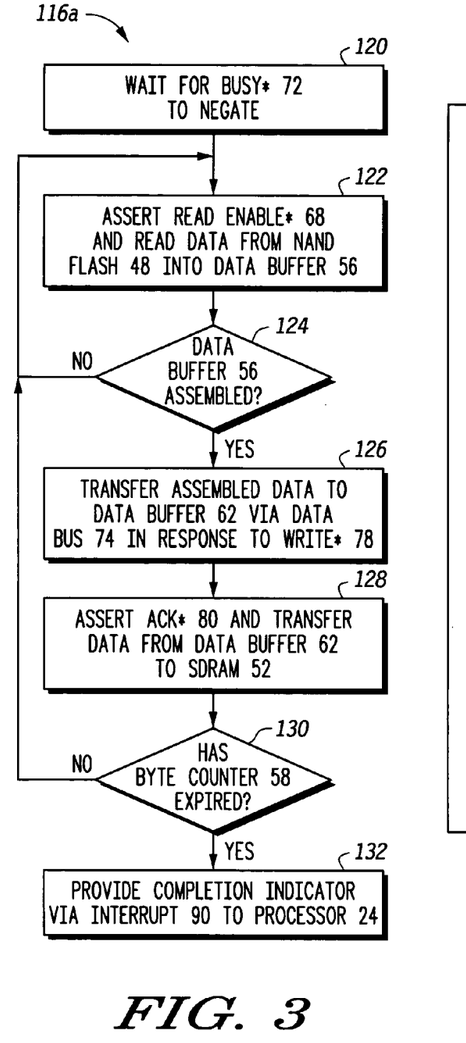
FIGS. 3–4 illustrate, in flow diagram form, memory system flows, in accordance with various embodiments of the present invention.
Figure 4:
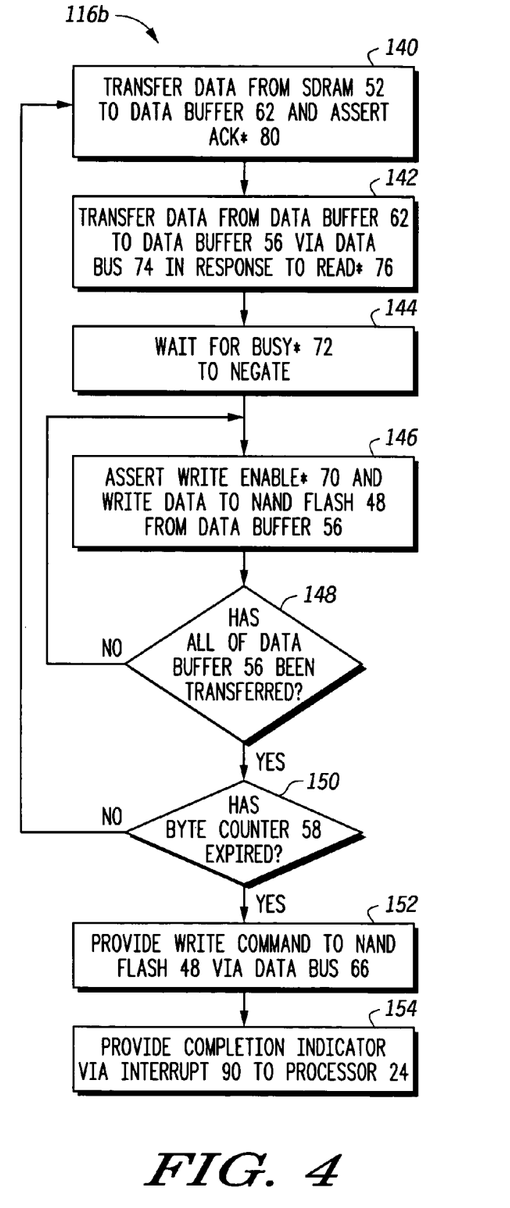

FIGS. 3 and 4 describe a memory system flow 116a and 116b, respectively, which may be used within memory system flow 116 of FIG. 2. Memory system flow 116a of FIG. 3 corresponds to a NAND Flash read command while memory system flow 116b of FIG. 4 corresponds to a NAND Flash write command. Therefore, depending on whether the NAND Flash command of block 110 of FIG. 2 is a read or write command, either memory system flow 116a or 116b, respectively, is used. Note also that memory system flows 116a and 116b correspond to memory system 92, where, in one embodiment, memory system flows 116a and 116b correspond to a hardware flow performed by hardware within memory system 92.

Referring first to FIG. 3, when a NAND Flash read command is loaded into data buffer 56 (corresponding to block 110 of FIG. 2), NAND Flash controller 40 begins a data transfer from NAND Flash 48 to SDRAM 52. For example, in one embodiment, NAND Flash controller 40 asserts WRITE_ENABLE* 70 and transfers the read command to NAND Flash 48 via data bus 66 from data buffer 56. Similarly, NAND Flash controller 40 may assert WRITE_ENABLE* 70 and transfer the block address to NAND Flash 48 via data bus 66. Flow 116a begins with block 120 where NAND Flash controller 40 waits for BUSY* 72 to negate, to ensure that NAND Flash 48 is not busy. Upon negation (or deassertion) of BUSY* 72, flow proceeds to block 122 where NAND Flash controller 40 asserts READ_ENABLE* 68 to read data from NAND Flash 48 (stored at the block address provided from data buffer 56) into data buffer 56.

In one embodiment, data is transferred one byte at a time from NAND Flash 48; however, in alternate embodiments, data bus 66 may be of different sizes such that data may be transferred more than one byte at a time from NAND Flash 48. At this point, byte counter 58 may be decremented after each read from NAND Flash 48 to keep track of the number of bytes that are transferred. In an alternate embodiment, as was described above, byte counter 58 can be decremented differently depending on the data portion size being counted. (In yet another embodiment, byte counter 58 may be incremented rather than decremented to keep track of the number of data portion sizes being counted.) In one embodiment, NAND Flash 48 may include a temporary buffer (not shown) where the block of data at the block address is stored into the temporary buffer before being transferred via data bus 66 to data buffer 56. Therefore, note that NAND Flash 48, or any other block accessible memory used in place of NAND Flash 48, may be implemented differently in different embodiments.

Flow then proceeds to decision diamond 124 where it is determined whether data buffer 56 is assembled. That is, more data may be transferred at a time via data bus 74 that can be received via data bus 66. For example, in the illustrated embodiment of FIG. 1, note that data bus 66 is an 8-bit bus while data bus 74 is a 32-bit bus. Therefore, once data buffer 56 receives four 8-bit pieces of data, it can then be transferred to SDRAM controller 44 via data bus 74. In this manner, data bus 74 may be more efficiently used rather than transferring single 8-bit pieces of data on a 32-bit bus. Therefore, in one embodiment, data buffer 56 is considered assembled when 32 bits of data are ready to be transferred. If 32 bits of data are not ready to be transferred (i.e. data buffer 56 is not yet assembled), then flow returns to block 122. However, if data buffer 56 is assembled, flow proceeds to block 126 where the assembled data is transferred to data buffer 62 via data bus 74 in response to WRITE* 78. For example, to transfer data from data buffer 56 to data buffer 62, NAND Flash controller places the assembled data onto data bus 74 and asserts WRITE* 78 to indicate to SDRAM controller 44 that the data is ready to be transferred, and SDRAM controller 44 then receives the data into data buffer 62. Flow then proceeds to block 128 where, after the data is received into data buffer 62, ACK* 80 is asserted. The received data is then transferred from data buffer 62 to SDRAM 52, and address counter 64 is incremented accordingly.

Flow then proceeds to decision diamond 130 where it is determined whether byte counter 58 has expired. If so, then the transfer requested by the NAND Flash read command has been satisfied, and flow proceeds to block 132 where a completion indicator is provided to the initiating system bus 14 bus master. For example, in one embodiment, NAND Flash controller 40 provides the completion indicator as an interrupt via interrupt 90 to processor 24. If byte counter 58 has not yet expired, then flow returns to block 122 since more data needs to be transferred. Note that in alternate embodiments, byte counter 58 may be incremented (rather than decremented) until it reaches the total number of bytes (or other data portion size being counted) to be transferred where decision diamond 128 would instead check whether byte counter 58 has reached the total number of bytes (or other data portion size being counted) to be transferred. Alternate embodiments may therefore use a variety of different ways to determine whether the transfer has been completed or not.

Data is transferred from NAND Flash 48 into data buffer 56, from data buffer 56 to data buffer 62, and from data buffer 62 to SDRAM 52 until a total number of bytes indicated by the NAND Flash read command is transferred. Also note that once data is received into data buffer 62, SDRAM controller 44 writes this data into SDRAM 52 into addresses indicated by address counter 64 which initially begins at the starting address provided in block 106 of FIG. 2. Each time data is written from data buffer 62 to SDRAM 52, address counter 64 may then be incremented to keep track of the target address in SDRAM 52. SDRAM controller 44 communicates with SDRAM 52 via data bus 82 and control 84. Therefore, in one embodiment, SDRAM controller 44 transfers a full 32 bits with each write to SDRAM 52 since data bus 82 is a 32-bit bus. In the embodiment illustrated in FIG. 3, ACK* 80 is asserted after data is written to data buffer 62. In an alternate embodiment, ACK* 80 may be asserted after data is transferred from data buffer 62 to SDRAM 52. Also, as described above, a data transfer request may be received by SDRAM controller 44 from a system bus 14 bus master via signals 86 from bus interface 38. If this data transfer request is received during a data transfer from NAND Flash controller 40 via data bus 74, then arbitration logic 98 may be used to arbitrate between the two requests. Note also that data buffers 56 and 62 can be of any size, depending on the designs of NAND Flash controller 40 and SDRAM controller 44.

Referring now to FIG. 4, when a NAND Flash write command is loaded into data buffer 56 (corresponding to block 110 of FIG. 2), NAND Flash controller 40 begins a data transfer from SDRAM 52 to NAND Flash 48. For example, in one embodiment, NAND Flash controller 40 asserts WRITE_ENABLE* 70 and transfers the write command to NAND Flash 48 via data bus 66 from data buffer 56. Similarly, NAND Flash controller 40 may assert WRITE_ENABLE* 70 and transfer the block address to NAND Flash 48 via data bus 66.

Flow 116b begins with block 140 where data is transferred from SDRAM 52 into data buffer 62. For example, NAND Flash controller 40 asserts READ* 76 to indicate to SDRAM controller 44 that data needs to be transferred from SDRAM 52 to data buffer 56. This data is transferred from data locations indicated by address counter 64 (loaded in block 106 of FIG. 2) via SDRAM bus 50. That is, SDRAM controller 44 communicates with SDRAM 52 via data bus 82 and control 84. Therefore, in one embodiment, SDRAM controller 44 receives a full 32 bits with each read from SDRAM 52 into data buffer 62 since data bus 82 is a 32-bit bus. Once data is ready to be transferred, SDRAM controller 44 asserts ACK* 80. In one embodiment, SDRAM controller 44 asserts ACK* 80 after each byte is received into data buffer 62. Alternatively, SDRAM controller 44 asserts ACK* 80 after 32 bits of data is received into data buffer 62 since data bus 74 is able to transfer 32 bits of data. Also, as described above, arbitration logic 98 may arbitrate, if necessary, between communications with NAND Flash controller 40 and system bus 14 via signals 86 and bus interface 38.

Flow then proceeds from block 140 to block 142 where the data is transferred from data buffer 62 to data buffer 56 via data bus 74 in response to READ* 76. For example, upon ACK* 80 being asserted, NAND Flash controller receives the data from data buffer 62 into data buffer 56. Flow then proceeds to block 144 where NAND Flash controller 40 waits for BUSY* 72 to negate in order to ensure that NAND Flash 48 is not busy. Once negated, flow proceeds to block 146 where NAND Flash controller 40 asserts WRITE_ENABLE* 70 to write data to NAND Flash 48 from data buffer 56. In one embodiment, data is transferred one byte at a time to NAND Flash 48; however, in alternate embodiments, data bus 66 may be of different sizes such that data may be transferred more than one byte at a time to NAND Flash 48. Note also that in one embodiment, data is transferred into a temporary buffer (not shown) within NAND Flash 48. (Alternatively, the data transferred may be transferred directly into NAND Flash 48 at the location starting at the block address provided from data buffer 56. However, as an example, NAND Flash 48 will be described herein in reference to memory system flow 116*b* of FIG. 4 as having this temporary buffer.) Note also that each time data is written to NAND Flash 48 (i.e. to the temporary buffer of NAND Flash 48), byte counter 58 may be decremented by the number of bytes transferred. In an alternate embodiment, as was described above, byte counter 58 can be decremented differently depending on the data portion size being counted.

Flow then proceeds to decision diamond 148 where it is determined whether all of data buffer 56 has been transferred. If not, flow returns to block 146 where NAND Flash controller 40 continues to write data to NAND Flash 48 (i.e. to the temporary buffer of NAND Flash 48). Note that in one embodiment, NAND Flash controller 40 writes data to the temporary buffer of NAND Flash 48 as it is received into data buffer 56 from data buffer 62. In an alternate embodiment, NAND Flash controller 40 waits until a full block size of data is assembled into data buffer 56 from data buffer 62 before writing this block into the temporary buffer of NAND Flash 48 (via block 146 and decision diamond 148).

If, at decision diamond 148, all of data buffer 56 has been transferred, flow proceeds to decision diamond 150 where it is determined if byte counter 58 has expired. If so, flow proceeds to block 152 where NAND Flash controller 40 provides a write command to NAND Flash 48 via data bus 66 so that the data in the temporary buffer of NAND Flash 48 can be written into NAND Flash 48 at a location starting at the location indicated by the block address written to data buffer 56 in block 110 of FIG. 2. During this program operation of NAND Flash 48, BUSY* 72 is asserted and once complete, BUSY* 72 is negated. At this point, the transfer requested by the NAND Flash write command has been satisfied, and flow proceeds to block 154 where a completion indicator is provided to the initiating system bus 14 bus master. For example, in one embodiment, NAND Flash controller 40 provides the completion indicator as an interrupt via interrupt 90 to processor 24.

If, at decision diamond 150, byte counter 58 has not yet expired, then flow returns to block 140 since more data needs to be transferred. Note that in an alternate embodiment, byte counter may be decremented at different places in flow 116*b*.Also note that in alternate embodiments, byte counter 58 may be incremented until it reaches the total number of bytes to be transferred where decision diamond 150 would instead check whether byte counter 58 has reached the total number of buts to be transferred. Alternate embodiments may therefore use a variety of different ways to determine whether the transfer has been completed or not.

Data is therefore transferred from SDRAM 52 into data buffer 62, from data buffer 62 to data buffer 56, and from data buffer 56 to NAND Flash 48 until a total number of bytes indicated by the NAND Flash write command is transferred. Note also that since NAND Flash 48 is a block accessible memory, full blocks of data are transferred to NAND Flash 48 from data buffer 56, therefore, NAND Flash 48 may receive more data than necessary (as indicated by byte counter 58).

Therefore, it can be understood how data may be transferred between NAND Flash 48 and SDRAM 52 in accordance with various embodiments of the present invention. Note that data may be transferred in a variety of different ways via SDRAM bus 50, memory controller bus 42, and flash bus 46. For example, in one embodiment, data may be transferred in bursts via SDRAM bus 50. Similarly, data may be transferred in bursts via memory controller bus 42. Therefore, one of ordinary skill in the art can appreciate that there may be a variety of modifications that can be made to the data transfer protocols that may be used via the various data buses of memory system 92. Furthermore, the methods of data transfer via memory controller bus 42 may change depending on the types of memory used, for example, in place of NAND Flash 48 or in place of SDRAM 52. Also, in alternate embodiments, memory system 92 may include any number (e.g. 2 or more) and type of memories that communicate via memory controller bus 42, which may be separate and independent of system bus 14 in order to allow for a more tightly coupled memory system with improved performance and reduced power consumption. Furthermore, the DMA circuitry and elements for performing transfers between these memories within memory system 92 may be distributed within memory system 92 (as was described above in reference to NAND Flash controller 40 and SDRAM controller 44) such that a separate, full fledged DMA unit coupled to system bus 14 is not necessary for data transfers among the memories of memory system 92.

Note that alternate embodiments may also include more, fewer, or different signals within memory controller bus 42 and may include different designs for NAND Flash controller 40 and SDRAM controller 44. Furthermore, portions of memory system 92 may be implemented in hardware, software, or combinations of hardware and software. Note also that system 10 can be implemented using any number of circuits, such as integrated circuits. For example, all of data processing system 12 may be on a same integrated circuit or may be located on any number of different integrated circuits coupled together. Also, memory system 92 may or may not include the memories such as NAND Flash 48 and SDRAM 52.

In the foregoing specification, the invention has been described with reference to specific embodiments. However, one of ordinary skill in the art appreciates that various modifications and changes can be made without departing from the scope of the present invention as set forth in the claims below. For example, any software taught herein may be embodied on one or more of computer hard disks, floppy disks, 3.5" disks, computer storage tapes, magnetic drums, static random access memory (SRAM) cells, dynamic random access memory (DRAM) cells, random access memory (RAM) cells, SDRAM calls, flash memory cells, electrically erasable (EEPROM, EPROM, flash) cells, nonvolatile cells, ferroelectric or ferromagnetic memory, compact disks (CDs), laser disks, optical disks, and any like computer readable media. Also, the block diagrams may include different blocks than those illustrated and may have more or less blocks or be arranged differently. Also, the flow diagrams may also be arranged differently, include more or less steps, be arranged differently, or may have steps that can be separated into multiple steps or steps that can be performed simultaneously with one another. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A data processing system, comprising:
  a system bus;
  a system bus master, coupled to the system bus;
  a first memory controller for controlling a first memory;
  a second memory controller for controlling a second memory; and
  a memory controller bus operating independent of the system bus, said memory controller bus being coupled to the first memory controller and to the second memory controller, said memory controller bus transferring data between the first memory controller and the second memory controller, wherein:
  the second memory controller comprises arbitration logic for arbitrating between the system bus master and the first memory controller for access to the second memory;
  when the data is transferred from the first memory controller to the second memory controller, the data is received by the first memory controller from the storage locations within the first memory prior to transferring the data to the second memory controller, and
  when the data is transferred from the second memory controller to the first memory controller, the data is received by the second memory controller from storage locations within the second memory prior to transferring the data to the first memory controller.

2. A data processing system as in claim 1, wherein the first memory is of a first memory type and the second memory is of a second memory type, and wherein the first memory type is different than the second memory type.

3. A data processing system as in claim 2, wherein the first memory type comprises block accessible memory.

4. A data processing system as in claim 3, wherein the first memory type comprises NAND Flash memory.

5. A data processing system as in claim 2, wherein the second memory type comprises random accessible memory.

6. A data processing system as in claim 5, wherein the second memory type comprises synchronous dynamic random access memory.

7. A data processing system as in claim 1, wherein the second memory controller comprises an address counter for storing a starting address.

8. A data processing system as in claim 1, wherein the first memory controller comprises a counter for counting a number of data portions transferred between the first memory and the second memory.

9. A data processing system as in claim 1, wherein the memory controller bus comprises:
  a plurality of data signals;
  a read signal;
  a write signal; and
  an acknowledge signal.

10. A data processing system as in claim 1, further comprising a third memory coupled to the system bus.

11. A data processing system as in claim 1, wherein the data processing system is formed on a single integrated circuit.

12. A data processing system as in claim 1, wherein the system bus master comprises a processor.

13. A data processing system as in claim 1, wherein the system bus master comprises direct memory access (DMA) circuitry.

14. The data processing system of claim 1, wherein:
  when the data is transferred from the first memory controller to the second memory controller, the data is provided by the second memory controller to the second memory for storage in the second memory after transferring the data to the second memory controller, and
  when the data is transferred from the second memory controller to the first memory controller, the data is provided by the first memory controller to the first memory for storage in the first memory after transferring the data to the first memory controller.

15. A data processing system, comprising:
  a system bus;
  a system bus master, coupled to the system bus;
  a first memory controller, coupled to the system bus, for controlling a first memory;
  a second memory controller, coupled to the system bus, for controlling a second memory;
  arbitration logic, coupled to the second memory controller, said arbitration logic arbitrating between the system bus master and the first memory controller for access to the second memory; and
  a memory controller bus operating independent of the system bus, said memory controller bus being coupled to the first memory controller and to the second memory controller, said memory controller bus transferring data between the first memory controller and the second memory controller.

16. A data processing system as in claim 15, further comprising:
  direct memory access (DMA) circuitry coupled to the system bus; and
  a processor coupled to the system bus.

17. A data processing system as in claim 15, wherein the first memory comprises block accessible memory.

18. A data processing system as in claim 15, wherein the second memory comprises random accessible memory.

19. A data processing system, comprising:
   a system bus;
   a processor, coupled to the system bus;
   direct memory access (DMA) circuitry coupled to the system bus;
   system bus arbitration logic, coupled to the system bus, said system bus arbitration logic performing arbitration on the system bus;
   a first memory controller for controlling a first memory;
   a second memory controller for controlling a second memory;
   a memory controller bus operating independent of the system bus, said memory controller bus being coupled to the first memory controller and to the second memory controller, said memory controller bus transferring data between the first memory and second memory by way of the first memory controller and the second memory controller; and
   memory controller bus arbitration logic, coupled to the second memory controller, said arbitration logic performing arbitration between the system bus master and the first memory controller for access to the second memory.

* * * * *